Sept. 27, 1966
A. VOGT
3,275,791
METHOD FOR WELDING AT LEAST ONE MEMBER TO A SUPPORT SUCH AS
A TIME-PIECE DIAL AND DIALS OBTAINED THROUGH SAID METHOD
Filed July 3, 1963
4 Sheets-Sheet 1
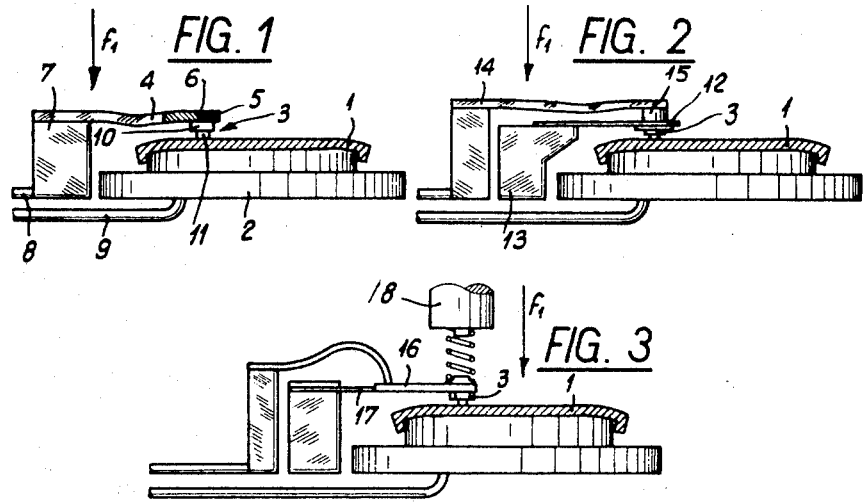
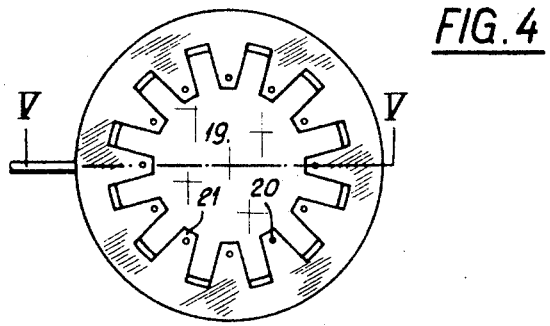
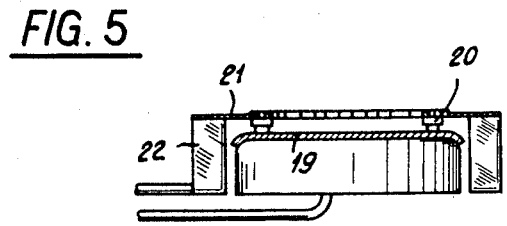

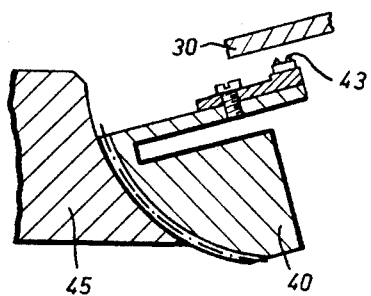
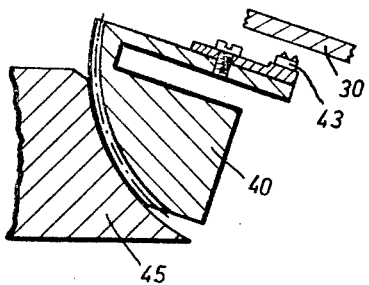
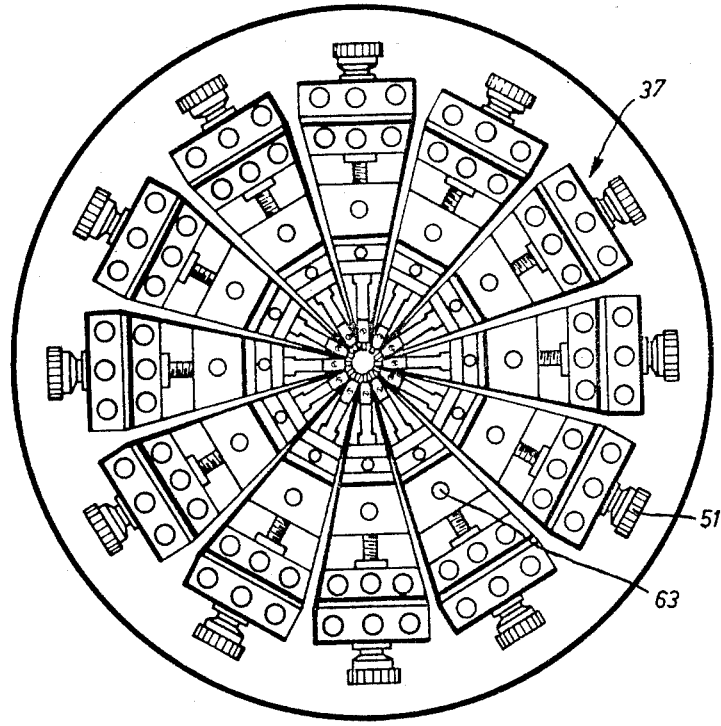

United States Patent Office 3,275,791
Patented Sept. 27, 1966

3,275,791
METHOD FOR WELDING AT LEAST ONE MEMBER TO A SUPPORT SUCH AS A TIME-PIECE DIAL AND DIALS OBTAINED THROUGH SAID METHOD
Andre Vogt, La Chaux-de-Fonds, Switzerland
Filed July 3, 1963, Ser. No. 292,637
Claims priority, application Switzerland, May 19, 1959, 73,406/59; Feb. 23, 1960, 2,013/60
14 Claims. (Cl. 219—103)

This is a continuation-in-part of my application, Serial No. 28,663 filed May 12, 1960, now abandoned.

This invention relates generally to watch dials and more particularly to a method and apparatus for securing time-indicia or hour symbols on substantially convex watch dial faces of dials for small watches.

This invention is an improvement in the process disclosed and claimed in U.S. Patent No. 3,197,846, issued August 3, 1965.

The invention solves the problem of holding the small symbols, joining the welding electrode with the symbols, as well as controlling the contact pressure during welding and ensuring precise positioning of the symbols on the dial in as simple as possible a manner and thus to create an economical manufacturing process for watch dials with symbols welded thereon.

It is an object of the present invention to ensure that, in the course of rapid melting of the welding projections on the small hour-symbols in the course of welding, the welding pressure is maintained by rapidly urging the hour-symbols toward the dials, so that the resistance is not momentarily interrupted or reduced to below a given value, thereby to avoid the formation of an electric arc because of breaking of the conducting connection.

It is another object of the invention to control the required welding pressure accurately and so that it can be produced, in such a way that it is on one hand high enough to ensure perfect welding, and on the other hand restricted enough for the welding projections not to be deformed prematurely or the symbols themselves, or even the watch dial surface, to be damaged. In this connection it is a particular object of the invention to ensure that the parts generating a defined welding pressure are set in such a way that they move without any friction, to avoid disturbances resulting from frictional forces.

Still another object of the invention is to arrange time symbols or indicia on a device which can be on one hand subjected to the welding pressure and on the other hand which permits adjustment of the symbols not only on flat watch dials but also on convex dials.

Yet another object of the invention is to provide a device which permits simultaneous welding onto a dial of all the symbols which the dial is to have welded thereon.

In general welding techniques it has been long known to secure a part to be welded to a more or less elastic holder, so as to be able to shift this holder towards the base and to provide it with pre-stressing. With such holding devices, the contact pressure is usually produced by means of a stressed spring. Several methods of welding are known for welding small parts, for example, in the semi-conductor welding art which consists in welding metal contacts, so-called whiskers, onto small semi-conductor elements. However, in welding "whiskers" in semi-conductors all that matters is that the metal forming the contact, or the metal plate, is pressed against the semi-conductor itself and that one prevents the local temperature of the semi-conductor material from exceeding a certain temperature in the course of welding. Welding in semi-conductors neither presents a problem of quickly moving the part to be welded towards the base, nor that of ensuring perfect adjustment or positioning of the parts to be secured by welding on a convex surface.

With respect to welding temperature, the problem with which the present invention is concerned is different in that it is desirable to heat the two contact surfaces as much as possible for a very short time in order to ensure perfect welding. The period of heating must, however, be sufficiently short, so that the heat does not have time to spread circumferentially of the welding spot itself, since the ornamental top coat of the dial surface which borders immediately on the welding spot must not be deteriorated by the heat.

The method according to the invention is characterized in that the contact pressure applied to the symbol onto the dial in the course of welding is controlled by means of a device which can be elastically deformed. The mass and elasticity of this device is chosen in such a way that when the welding projections on the rear side of the symbol melt it enables the symbol to be momentarily pressed against the dial. The required welding pressure is maintained during this process. This device is used at the same time for positioning and adjusting the time symbol or indicium on the surface of the dial.

The drawing illustrates schematically several embodiments of devices for implementing the method according to the invention.

FIGS. 1, 2 and 3 are side elevation views of a first, second and third embodiment of an elastic support for welding time symbols or indicia;

FIG. 4 is a plan view of a fourth embodiment of an elastic holder;

FIG. 5 is a cross-section view taken along the line V—V in FIG. 4;

FIGS. 9 and 10 are two cross-section views of apparatus for tilting the holder of the support according to FIGS. 7 and 8;

FIG. 12 is a plan view of twelve supports illustrated in operation while twelve symbols are being welded onto a dial.

Figure 6:
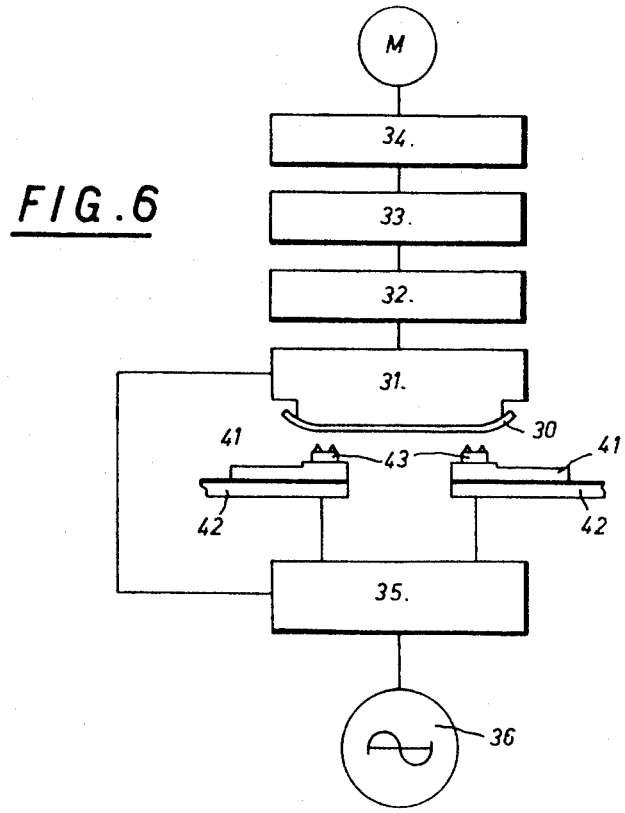
FIG. 6 is a schematic diagram of a welding machine for applying the method according to the invention.

In order to better illustrate the solution of the problems solved by the present invention, the following numerical data is given to start with: The symbols or time indicia on dials for small watches have a normal height of between .25 and .5 mm. The so-called "giant symbols" have a height of over .7 mm. whereas miniature symbols have a height of less than .25 mm. The height of welding projections on these symbols will appropriately be chosen in the range of .1 to .2 mm. The welding projections may vary considerably in shape. The principal thing that matters is the fact that the cross-sections of the welding contact points should be smaller than the cross-section of the actual symbol to ensure complete covering by the symbol, when the dial is finished, of the weld spot itself and without possible formation of excessive welding material around the actual weld point or spot.

The cross-section of the welding projections depends on the size of the symbols as well as on the hardness of the material used for the symbols and may vary between .001 and 5 mm.$^2$. The welding pressures are chosen accordingly.

The welding projections may have the shape of a polygon, preferably that of a four-sided pyramid or of a circular cone. The base of the cone or pyramid faces the symbol and the tips are slightly rounded off. The number of projections depends on the total tightness to be achieved. In principle one projection is sufficient, but two or even four projections are often used. Instead of providing the lower side of the symbol with projections it is possible also to shape these as domelike spherical segments. Instead of securing the projections to the symbols, the invention also includes the possibility of providing the dial itself with projections.

In order to arrange the welding positions on the dial on a slightly lower level than the actual surface and in order to make watches of a reduced height to suit modern fashion requirements, it is possible also to provide the dial with recesses in the welding position. The actual welding then takes place at the bottom of these recesses and the weld spot is then completely covered by the individual indicia.

The welding time should be as short as possible in order to avoid any visible change in the finished surface of the dial as a result of the welding heat, or even more important to avoid any deformation of the dial. Even the slightest discoloration of the electroplated top coat and, as the case may be, of the protective veneer, should be avoided. It has been found that welding impulses used should be in the range of five to one milliseconds. The shorter the welding time, the more the heat remains concentrated in the welding position and the higher the pressure may therefore be chosen, without running the risk of undesirable deformations of the symbol in the neighborhood of the weld area.

Tests have shown that current intensity should be chosen in the range of about $10^3$ a. per projection. Many combinations of welding data and dimensions of projections are possible in order to achieve perfect securing of the symbols to the dial.

The following data are, however, indicated as being a typical combination for dials of small watches. It will be understood that these refer to a specific and by no means restricted embodiment:

The welding projection of the symbol has the shape of a four-sided pyramid with a cross-section at the base of $5 \times 10^{-2}$ mm.$^2$. The top of the pyramid is slightly rounded off. The height of the projection is .1 mm. The welding current per projection is 1000 a. and the duration of the welding impulse .8 ms.

The welding pressure per projection required for generating the desired welding contact pressure is in the order of 1.5 kg.

In order to ensure that with maximum admissible welding pressure (which is generated before actual welding and which may of course not cause deformations of the symbol with the projections while they are still cold) the symbol with its elastic holder can be accelerated towards the dial with adequate speed, while the projections are being momentarily melted, and in order to maintain sufficient welding pressure, the symbols and the displaced holder may not exceed a given weight, i.e. a given mass. This maximum critical mass is as follows:

$$m_{max} = F \cdot t^2 / 2s \text{ (kg.)}$$

In this equation, F represents the contact pressure during welding in N (Newton); $t$ represents the duration of the welding time in seconds and $s$ the travel of the symbols during welding of the projections in meters. If in the above equation F is 1.5 kg.=15N, $t$=.8 ms. and $s$=.1 mm. (height of the projections) the result is as follows:

$$m_{max} = 15 \cdot .64 \cdot 10^{-6} / .2 \cdot 10^{-3} = 48 \text{ g.}$$

If the mass of the flexible device which produces the following action in the course of welding exceeds this critical value, accurate welding is no longer possible and an electric arc is formed. The above value represents the extreme permissible upper limit of the mass and in practice the mass chosen should be considerably lighter. Therefore, only a very light spring or a very thin elastic organ may be used as a holder for the symbols.

In the drawings and more particularly in FIG. 1, according to the invention a dial 1 is completely prepared for welding time indicia thereon and has an ornamental top coat separate from the base metal of the dial. Individual symbols 3 to be fixed on the dial comprise the actual symbol 11 and a lug 10. The projections or domes, heretofore mentioned but not shown, are provided underneath the part 11. The dial 1 is first set over a pedestal 2, after which the accurately positioned symbol or time indicium to be welded is secured to a yielding blade 4 mounted on a block 7. A stem 5 rigid with the symbol 3 engages a corresponding opening 6 formed in the blade 4. The block 7 and the blade 4 are then shifted towards the dial in the direction of the arrow through application of welding pressure by a mechanism, not shown. The symbol 3 engages first the dial with a slight pressure and, upon continuation of the movement of the blade 4, the blade causes the symbol 3 to exert a higher pressure of a predetermined value on the dial. Upon energization of a welding transformer, which is not illustrated, welding current is applied through the leads 8 and 9 between the block 7 and the pedestal 2 across the blade, the symbol to be welded and the dial. The welding current melts the metal, which allows the blade 4 to urge the symbol 3 towards the support, in order to compensate for the shrinking of the material and the spreading out of the molten metal. The current is applied during about $.5 \cdot 10^{-3}$ to $1 \cdot 10^{-3}$ seconds and the sag resulting from the blade being bent may be of a magnitude of, say, .1 to .2 mm. The elastic blade 4 at the same time permits, apart from an approximate adjustment obtained by the tilting movement of the entire holding device, accurate, firm positioning of the symbol rear side or base on the dial surface even though it is generally arcuate or convex (as indicated on FIG. 1). The rear side of the symbol will lie automatically in close contact with the dial surface as a result of the pressure being exerted on the dial. The symbol 3 being welded is separated from the blade 4 and its upper section 10 is machined e.g. through turning, so as to leave in position only its lower section 11, the shape of which corresponds to the final desired shape of the welded symbol. It is also possible to finish the symbol by various finishing treatments, for example, polishing. The mass of the symbol 3 and the elastic part of the elastic blade 4 are fairly small, in accordance with the above requirements.

The embodiment according to FIG. 1 provides for only one blade 4, with which pressure is generated. For the reasons stated below, it is, however, recommended that another force be applied to the light elastic holder carrying the symbols. The elastic parts generating this force are not necessarily submitted to this restrictive requirement of a small mass. In order to ensure good welding it is necessary that besides an accurate initial pressure and the maintenance during welding of a minimum welding pressure despite momentary yielding of the symbol, there should also be a minimum subsequent pressure while the welding point is cooling down. This subsequent pressure must be stronger than that during welding, in order to improve in a known manner the crystalline structure of the weld.

If only one prestressed elastic blade is used for increasing pressure, which slackens while the projections are welded, the creation of this subsequent pressure is not required since the elastic pressure decreases a little while the blades slacken and since it could be increased again only by shifting or turning the entire holder. Another disadvantage of using only one elastic blade is the fact that, in order to adjust symbols within larger ranges conditioned by the dimensions of the symbols and the dial, it is necessary to arrange the blade itself, together with its support, on the frame of the welding tool in such a way as to be movable, by means of suitable screw connections or swing joints. The reason for this is that the clearance of adjustment is very limited because of the elasticity inherent in the blade, and it can, moreover, not be used thus for positioning the symbols if a given pressure is to be applied which is conditioned by a certain deflection.

However, all adjustments of the holder by means of screws and joints are subject to a certain amount of friction, the effects of which impair the possibility of constant, variable and reproducible adjustment of both positioning and pressure. This reproducibility has, however, great economic significance, since even one defectively welded symbol out of 100 symbols already represents a dial waste of 12% since dials are usually provided with twelve hour-symbols.

The above-mentioned disadvantages of one single elastic device are eliminated by the invention by subjecting this elastic blade carrying the symbol to another elastic device, as shown schematically in FIGS. 2 and 3. According to the second embodiment of the invention, the symbol 3 is welded to a yielding blade 12 carried by a block 13. An arm 14 is provided which is also flexible and which carries the contact-piece 15 through which the welding current is applied. The blade 12 and the arm 14 form a yielding part which may be shifted in the direction of the arrow to jointly urge the symbol 3 against the dial 1. As shown the initial pressure is regulated by suitable pre-stressing of the two elastic members 12 and 14. At the time of momentary melting of the projections and of momentary yielding of the symbol 3 the fairly light, elastic blade 12 follows this shifting movement and thus maintains minimum welding pressure between the symbols and the dial 1, while the elastic arm 14 which is heavier, due to its greater inertia, only follows with difficulty although it will again become active in order to generate the above-mentioned subsequent pressure.

If the stress chosen is, e.g. 1.5 kg., the pressure rates during welding develop about as follows: In the beginning there will be an initial pressure of P between the symbols and the dial. At the moment of welding, this pressure suddenly decreases down to the level of the pressure exerted by the blade 12 which represents e.g. 60% of P. After this the pressure again rises "slowly" until it reaches nearly the level of P. This rise is conditioned by the extent to which the heavier arm 14 slackens in its following action.

According to the third embodiment (FIG. 3), symbol 3 is welded to a blade 16, of which only an end portion 17 is yieldable. An elastic follow-up arrangement or device 18, corresponding to the arm 14 (FIG. 2) applies an elastic pressure to the blade 16. The device 18 urges the symbol 3 into engagement with the dial 1 and is tensioned a predetermined value. When welding current is applied, the metal begins to melt and the elastic arrangement (at the moment of melting, blade 16, 17 is followed-up by arrangement 18) urges the symbol 3 in the direction of arrow $F_1$ into firm engagement with the dial.

FIGS. 2 and 3 are schematic illustrations of how a second elastic device is active in following action on the weld itself, FIGS. 6 to 12 later described illustrate an apparatus where the first elastic arm is itself fastened to a suspended elastic support. In the fourth embodiment, a dial 19 of a time-piece on which hour-symbols or time-indicating indicia 20 are to be welded is illustrated in FIGS. 4, 5. The time symbols are carried by elastic tongues 20 on a carrier 21 positionable on an electrically conductive annulus 22. Welding current is applied through the carrier, which acts as a fixture, and a pedestal supporting the dial as illustrated. The movements of the tongues to urge the symbols into contact with the face of the convex dial 19 are controlled by means not illustrated. These means may be operated independent or operate simultaneously, or be operated as pairs.

In modifications, not shown, of the fourth embodiment, the symbols to be welded may be manufactured integral with at least part of the holder flexible section, so as to each form a single integral unit with the holder. This unit may be made by stamping, electrodeposition or any other suitable method. The separation between the symbols to be welded and the holder carrying them may then be obtained by mechanical machining of the unit, e.g. by turning after the symbol is secured to the dial.

It is also possible to use one or more blades and to fix on each of them one or more symbols to be welded. Furthermore, the methods for securing the symbols to the blades may vary, thus they may e.g. merely be placed inside recesses of the holder, or secured by mechanical clamping.

According to a modification of this method, it is possible, when yielding sections carrying the symbols have been brought into contact with the dial, to subject the symbols and yielding sections to supersonic waves instead of an electric current. It is a well-known fact that application of supersonic waves produces an extremely clean weld of very high performance, provided, of course, its parameters, in particular its amplitude and frequency, are suitably selected. This not only causes the surfaces of the parts to be welded together to melt, but it also results in a thorough scouring of these surfaces due to the heavy shocks to which they are subjected.

According to a further modification, the supersonic waves may be superimposed over the electric current. The weld thus produced has both the advantages of resistance welding and of supersonic welding. Supersonic transducers are well known in the art and need not be described further in this context. A known supersonic head of this type is placed onto the elastic holder over the symbol.

Following the schematic description of the principle of welding according to the invention, illustrated by the above examples, a detailed description follows of a welding apparatus for carrying out the method of the invention. Reference is made to FIGS. 6 to 12.

The rough schematic structure of the welding machine is represented in FIG. 6. A watch dial 30 onto which the symbols are to be welded is fastened to a dial holder 31 by its rear side. This dial holder 31 can be made to vibrate by means of a vibratory device 32 which is not further described here. The vibrations are parallel to the dial plane, preferably in such a way that the dial describes small circles the diameter of which can be controlled. As a result of this vibratory movement, the protective veneer with which the dial face surface (which in FIG. 6 faces downwardly) may have been provided, will be pierced by the projections of the symbols.

By means of an elevation adjustment device 33 and a swinging device 34 which are not further described here, the dial holder 31 can change its position both vertically and horizontally so as to facilitate inserting or removing of the dial. These mechanical devices are motor-driven by the motor M. The symbols 43 to be welded on the face of the dial are placed on an annular base 41, with which they may form one single unit, which may have been produced e.g., through stamping, milling or casting. In this case the annulus 41 can serve at the same time as a welding electrode, to which the welding current is applied through an elastic arm 42, or directly, over a flexible connection which is not shown. Naturally the symbols 43 can also be made and finished separately from the annular holder or base 41 and be subsequently secured thereto. It is also possible simply to adjust them inside a correspondingly shaped recess in the holder 41.

The holder constituting an electrode is made of an appropriate, soft material which is a good conductor, and which does not visibly mar the top side of the symbol, so that after welding only minor polishing of the symbol surface is required.

The holder 41 with the symbols is disposed on an elastic arm 42, which forms part of a support 37 which is further described below. The use of a holder 41 has moreover the advantage that it is possible to weld, with one single elastic arm (42) symbols of any shape and any type, simply by exchanging the holder 41 which is adapted to the various symbols. Lastly the holder 41 may be constituted as a template and serves to adjust exactly the position of the symbols on the arms 42.

The electric apparatus for welding, which does not form part of this invention, is schematically represented by the block numbered 35 and is energized by a current source 36. The welding current flows across the holder 41, the symbol 30 and its projections as well as across dial 30 and the dial holder 31.

Figure 7:
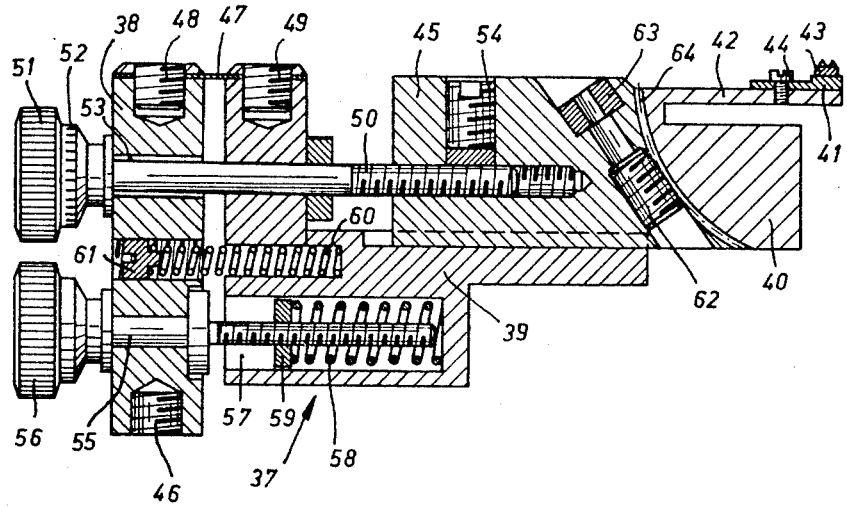
FIG. 7 is a cross-section view of one of the supports of the welding machine shown in FIG. 6.
Figure 8:
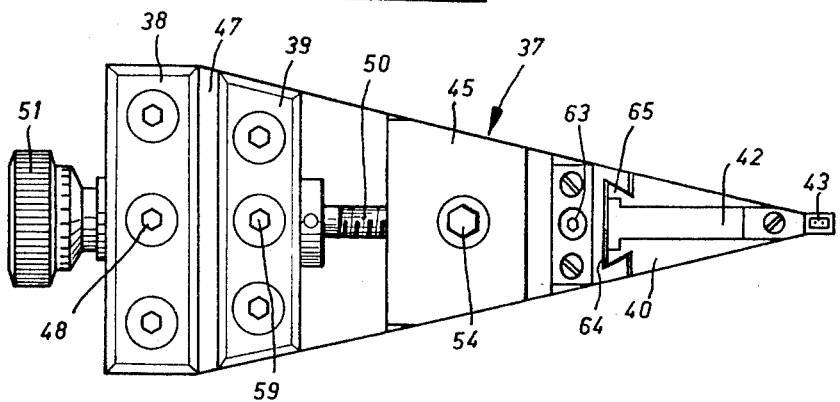
FIG. 8 is a plan view of the support shown in FIG. 7.

FIG. 7 is a cross-section of a support 37, usable in the apparatus in FIG. 6, the outer shape of which is that of a sector (FIG. 8). While as later described a plurality of supports such as support 37 are used in apparatus for the invention only one will be described in detail. Support 37 consists of a socket 38 secured tightly to the frame of the apparatus by means of screw 46, a carrier 39 secured resiliently in relation to the socket 38, a sliding carriage 45, which slides on carrier 39, and a holding piece 40 which is arranged on the sliding carriage so that it can be rotationally moved. The holding piece 40 is provided with an elastic arm 42. The base 41 which carries the symbol 43 is secured to the elastic arm 42 by means of screw 44. The arm 42 corresponds to 4, 14, and 16, 17 according, to, respectively, FIGS. 1, 2 and 3.

The socket 38 is elastically connected to the carrier 39 by means of a laminated spring 47 secured by set screws 48 and 49, on the two members 38, 39. A threaded adjusting screw 50 provided with a knurled head 51 and a micrometer scale 52 extends, with some clearance, through an opening 53 of the socket 38 and through a bore on the carrier 39. The threaded end of the screw 50 engages a corresponding thread in the sliding carriage 45. The adjusting screw 50 makes it possible to adjust exactly the position of the sliding carriage 45 in relation to the carriage 39. The adjustment can be read on the micrometer scale. The position of the screw 50 can be locked by means of a set screw 54.

A second adjusting screw 55, parallel to the first screw 50, and having a knurled head 56 extends through an opening in the socket 38 and enters a large space or blind bore 57 of carrier 39, inside of which is disposed a spring 58. The spring surrounds the screw 55 circumferentially with some clearance. The spring 58 is clamped between the blind end of the bore 57 and a traveling nut 59, which is threaded on the thread of the screw 55 and which can be moved inside the bore 57 only axially. By turning the screw 55 the position of the nut on the screw, and thus the compression of the spring 58, can be changed.

By changing the tension of the spring 58 it is possible to roughly adjust the strength of the elastic stress which acts against a turning movement of carrier 39 in relation to socket 38 when pressing on the elastic arm 42. For accurate adjustment of this elasticity there are two further smaller springs 60, which are arranged in corresponding recesses which are in registry with each other, inside socket 38 and carrier 39 between the screws 50 and 55. For the sake of simplicity FIG. 7 only shows one spring 60 which lies in the plane formed by screws 50 and 55. In actual practice, it has proved useful to provide for two such springs which are arranged, respectively, in front and behind the plane of the symbols according to FIG. 7. By means of one screw 61 compression of these springs may be changed as required to accurately adjust the above-mentioned elastic stress.

The holding piece 40 has a circular and convex surface on the side facing the sliding carriage 45 and engages a correspondingly concave, arcuate end surface of the sliding carriage 45. The plan view of the holding piece 40 (FIG. 8) illustrates that the holding piece 40 is preferably provided with a dovetailed lug 65 which extends into a correspondingly shaped opening in the sliding carriage 45. In this manner, it is possible to ensure perfect driving for the subsequently described tilting movement.

As shown in FIG. 7, the sliding carriage 45 is provided with a screw 62 having a knurled screw head 63 which is placed in such a way that the thread of the screw lies tangentially in relation to the inclined area of contact of the sliding carriage 45 and engages a corresponding thread 64 on the convex side of the lug 65 of the holding piece 40. Thus, it is possible to turn the holding piece 40 in relation to the carriage 45 by engaging a screwdriver in the slotted head 63. The holding piece 40 is so dimensioned that the center of the rotating movement lies exactly in the plane of symbol 43. This means that by means of the screw 62 it is possible to adjust the direction of the symbol 43 in the symbol plane according to FIG. 7 as required by turning the holding piece 40. This possibility of adjustment is important since the dials on which the symbols or hour-indicia are to be welded are usually convex. This convexity of the dial 30 is represented schematically in FIG. 6. The orientation of the symbols must be adapted to this convexity before welding.

The support 37 described above thus permits, on the one hand, to displace the symbol 43 by shifting the sliding carriage 45 radially in relation to the dial 30, and on the other hand to adjust it exactly in relation to the dial plane by turning the holding piece 40 and lastly, because it is elastically secured to holder 39 on socket 38, to move it in the direction of the dial plane and at the same time adjust the pressure exactly.

FIGS. 9 and 10 show two possible turning positions of the holding piece 40 in relation to the sliding carriage 45, under the assumption that the marginal edge portions of the dial 30, of which a part is represented in each instance, lies in the one and then in the other direction in relation to the principal plane of the dial.

Figure 11:
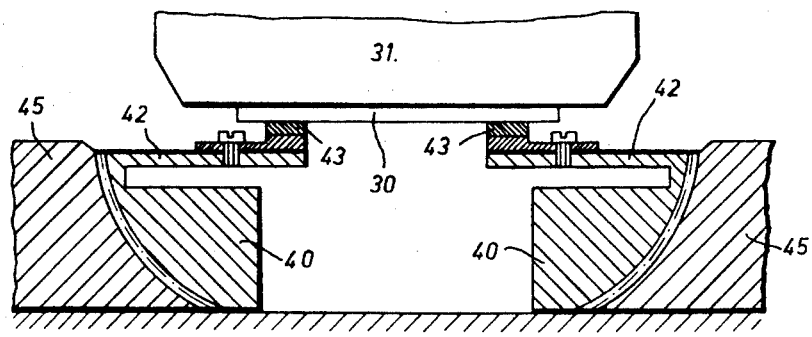
FIG. 11 is a schematic cross-section view illustrating two supports in operation at the end of the welding process according to the invention.

FIG. 11 is a schematic illustration of the stage when welding is finished, the projections of symbols 43 having disappeared and the symbols being flat on the dial 30.

FIG. 12 is a plan view of the complete arrangement of twelve supports in the course of the welding process. The supports 37 which are shaped as sectors and which are tapered towards the center can be arranged in a circle, the tips carrying the symbols lie in a circle over the dial in those positions in which they will have to be welded. Due to the means of adjustment above decribed it is possible in a relatively simple manner to ensure exact and individual positioning on the relatively small dial of every individual support with its holding piece 40 and the symbol 43 which is arranged on the elastic arm 42.

The welding process with the devices described above includes the following stages: The twelve prepared symbols 43 which are provided with their welding projections are placed one each on the twelve elastic arms 42. This is done by means of base or holder 41. During this process the dial holder 31 is either shifted upwards or flipped to the side. The holding piece 40 is then positioned approximately according to FIG. 12. The finished dial 30 is then placed on the dial holder 31 after which this holder together with the dial is lowered onto the symbols. Pre-stressing, i.e. the orientation of the carriers 39 together with their sliding carriages 45 against the action of the elastic means, is achieved by means of a corresponding lowering of the dial holder 31 in such a way that the elastic arms 42 and to a lesser degree also all supports 37 are pressed down by the dial surface which is in contact with the symbol surfaces which are pointing upwards.

The support 37 of every individual symbol is then adjusted radially by means of the respective screws 50 the knurled heads 51 of which are shown in FIG. 12 and the orientation of the symbols on the usually convex dial is then adjusted, individually for every support, by means of the individual screws 62, the heads 63 of which are also shown in FIG. 7.

The individual screws 55, which act on the strong springs 58, are then roughly set to obtain the described contact pressure. Accurate adjustment of the desired contact pressure is finally obtained by means of the screws 61 which act on the weak springs 60. The described means of adjustment permits perfectly constant and above all frictionless modification of the pressure, which means that the pressure can be altered with great precision. Entirely reproducible adjustment data can thus be achieved for every single dial, a feature which has great importance in avoiding waste of the relatively expensive dials and symbols.

All the geometric data as well as all pressure data can be read on micrometer scales arranged in suitable places, of which one (52) is indicated on screw 50 by way of example; any other known metering graduation may of course also be used.

When the symbols have been adjusted all twelve of them are welded simultaneously by means of a welding current impulse being applied through arms 42, base 41, symbols 43 and their projections as well as through the dial. When welding is finished the symbols are removed from the bases 41 and their top surfaces receive finishing treatment.

It is essential with the device as described, that the welding pressure should be maintained while the projections are being welded by the light elastic arms 42, the mass of which meets the requirement indicated in the beginning, and which can therefore be accelerated towards the dial with sufficient speed.

The other elastic means (springs 58, 60 and the spring blades 47) permit on one hand constant reproducible and frictionless adjustment of the required pre-stression which was already mentioned and moreover ensure sufficient subsequent pressure when welding is terminated.

Naturally the invention is not restricted to the described welding apparatus, of which numerous modifications are permissible without departing from the object of the invention. Thus it is possible to apply the current by means of a special electrode placed around arm 42 so that the base 41 is not used as an electrode or can even be dispensed with.

One process of welding a finished symbol consists in providing the visible side of the symbol with a device formed of several small blades similar to supporting grips, a small welding electrode made of suitable material being arranged between the blades and the symbol. This method pemits distributing the transfer of welding current onto the symbol in several locally restricted ranges on the visible side of the symbol, so that excessive warming up in one place of the visible side of the symbol and thus marring of its surface can be avoided. After welding the visible side of the symbol merely needs to be polished slightly.

On the other hand it is possible also to provide each support 37 with several holding pieces 40 each carrying one symbol or each holding piece 40 or elastic arm 42 carrying several symbols. All these modifications are covered by the object of the above-described invention whose most important feature is the elastic holder of the symbols. The above-described devices are in particular also suited for welding with supersonic energy or with a combination of electric and supersonic energy, since the elastic holders are well suited for vibrations. The supersonic energy is applied by known transducers, not shown.

While preferred embodiments of the invention have been shown and described it will be understood that many modifications and changes can be made within the true spirit and scope of the invention.

What I claim and desire to secure by Letters Patent is:

1. A method of permanently securing time indicia on a finished major face surface of a small watch dial which comprises, providing a flexible holding element having at least one indicium secured thereto, positioning said holding element on said major surface of said dial with said indicium in contact with said surface, welding the contact surfaces of said indicia with respective areas of said major face surface to permanently secure said indicium on said major face surface, and before and during said welding applying locally a pressure on said indicium by means of said holding element directed to hold said indicia in position on said major face surface and of a sufficient force to hold said indicium in intimate contact with said major face surface and to apply a follow-up force on said indicium to move said indicium and said dial toward each other to compensate for the shrinking produced by said welding.

2. A method of permanently securing time indicia on a small watch dial comprising, providing at least one dial having a finished major face surface and a plurality of separate indicia for securing on said major face surface, placing at least one indicium on said major face in a position it is to occupy relative to other indicia, securing elastic means on said indicium on a free side of said indicium facing away from said dial blank to elastically urge said indicium against said major face surface, applying an electrical welding current across said indicium and said dial blank to melt the indicium along a surface adjacent sad major surface, and shifting the indicium toward said major face surface to compensate for said melting, and removing the elastic means.

3. A method of permanently securing time indicia, on a finished watch dial comprising, providing at least one dial having a major face surface without time indicia and a plurality of separate indicia for securing on said major face surface, placing at least one indicium on said major face in a position it is to occupy relative to other indicia, securing elastic means on said indicium on a free side of said indicium facing away from said dial to elastically urge said indicium against said major face surface, applying an electrical welding current across said indicium and said dial to melt the indicium along a surface adjacent said major surface, and shifting the indicium toward said major face surface by at least 0.2 millimeter to compensate for said melting, and removing the elastic means.

4. A method for welding a shaped time symbol on a small fiinished watch dial by means of elastic means, comprising the steps of providing a watch dial, securing temporarily a plurality of conductive symbols on a common annulus in the relative positions said symbols are to occupy on said dial, said annulus having resilient portions urging said symbols toward and dial, laying the symbols on said dial at the location they are to occupy on said dial, urging the annulus and symbols toward the dial, applying a welding current across the symbols and the dial to melt a part of the symbols adjacent the dial and thereby allow the elastic means to shift the symbols further toward the dial to compensate for the shrinking produced by said melting, and removing the elastic means.

5. A method for welding a symbol having a projection on a small finished watch dial comprising, providing a watch dial to which the symbol is to be welded, attaching the symbol to elastic means temporarily, laying the symbol on said dial in the location it is to occupy, urging the elastic means and thereby said symbol against the dial, applying a welding current across the symbol and the dial to melt said projection of the symbol adjacent the dial to thereby allow the elastic means to shift the symbol further towards the dial to compensate for the shrinking produced by said melting, and removing the elastic means.

6. A method for welding a symbol having a projection on a small finished watch dial by means of elastic means, comprising the steps of providing a dial to which the symbol is to be welded, laying the symbol on the dial in the location it is to occupy, causing the elastic means to act on a free side of the symbol facing away from the dial to continuously urge said symbol against the dial, applying a welding current across the symbol and the dial to melt a portion of said projection of the symbol adjacent the dial, the cross-section of said projection ranging between $10^{-2}$ and 5 sq. mm. over a height of $10^{-2}$ to 1 mm. and thereby allow the elastic means to shift the symbol further towards the dial to compensate for the shrinking produced by said melting, and removing the elastic means.

7. A method for welding a shaped time symbol on a small finished watch dial by means of elastic means, comprising the steps of providing a dial to which the symbol is to be welded, laying a symbol on the dial in the location it is to occupy, securing elastic means to said symbol, causing the elastic means to act on a free side of the symbol facing away from the dial to urge said symbol against the dial, applying a welding current during $5.10^{-4}$ to $5.10^{-2}$ seconds across said symbol and the dial to melt a fraction of the symbol adjacent the dial and thereby allow the elastic means to shift the symbol further towards the dial to compensate for the shrinking produced by said melting, and removing the elastic means.

8. A method for welding a shaped time symbol on a front major surface of a small finished watch dial comprising the steps of supporting a dial in fixed position with said front surface of the dial exposed, providing and positioning a symbol having a flexible holding element in predetermined position adjacent the front surface of the dial, applying a pressure to the symbol by means of said element in a direction to move the symbol into engagement with said front surface of the dial in the location it is to occupy thereon, passing a welding current across the symbol and the dial to melt a fraction of the symbol adjacent the dial while concurrently is being applied pressure to the symbol in the direction of the dial by said flexible holding element to shift the symbol further towards the dial to compensate for shrinking produced by said melting, and removing the application of pressure to the symbol after the symbol has been welded to the dial.

9. A method for welding a shaped time symbol on a front major surface of a small finished watch dial comprising the steps of supporting a dial in a fixed poistion with said front surface of the dial exposed, positioning an elastic arm relative to the front surface of the dial with a free end of the elastic arm extending over the dial and a portion of the elastic arm being supported at a location spaced from the free end thereof and etxending beyond the edge of the dial, securing a conductive symbol at the free end of the elastic arm and relative to the dial in the location it is to occupy, moving the elastic arm in a direction toward said front surface of the dial and thereby the symbol into engagement with the dial, increasing the pressure on the elastic arm, passing a welding current across said symbol and said dial to melt a fraction of the symbol adjacent the dial and thereby allow the pressure exerted through said elastic arm to shift the symbol further towards the dial to compensate for shrinking produced by the melting, and thereafter removing the elastic arm from engagement with the symbol.

10. Process for welding symbols onto small finished dials, which comprises securing the symbols on a first elastic device, with which the symbols are urged toward a dial, the in fixed position mass of this device being sufficiently small that, while projections on the symbols are melting, said device is momentarily accelerated and shifted towards the dial maintaining a minimum required welding pressure on said symbols, and prior to urging said symbols toward said dial prestressing the entire first-named device to develop a sufficiently large initial and follow-up pressure during partial relaxation of the first device due to partial melting of said symbols in an area in contact with said dial, and applying a welding energy to said symbols to weld them on said dial.

11. A method for securing shaped time symbols on a small finished watch dial face comprising, providing a symbol carrier having a plurality of symbols thereon spaced angularly in fixed positions corresponding to relative positions to be occupied by the respective symbols when secured to said dial, said carrier having resilient portions urging said symbols toward said dial superimposing the symbols and said carrier on said dial with said symbols making contact with said dial face, welding only said symbols on said dial face while applying a resilient force on said symbols with the carrier holding said symbols in fixed relative positions, and removing said carrier so that the symbols remain on said dial face.

12. A method for securing a plurality of shaped time symbols on a small finished watch dial face comprising, providing a watch dial having a finished face to which said symbols are to be permanently secured, providing an annulus having integral therewith radially spaced thereon a plurality of electrically conductive symbols representative of time indicia and disposed in fixed relative angular positions corresponding to relative positions to be occupied by said symbols on said dial face, said annulus having resilient portions urging said symbols toward said dial superimposing said annulus and said symbols thereon over said dial face with said symbols disposed making contact with said dial face adjacent the peripheral marginal edge portions thereof, applying a welding current to at least said symbols to weld only them on said dial face, and mechanically removing said annulus from said dial face leaving said symbols welded on said dial face.

13. A method for securing a plurality of shaped time symbols on a watch dial according to claim 12, wherein welding is effected by electric and supersonic energy.

14. A method for securing a plurality of shaped time symbols on a watch dial according to claim 12, wherein welding is effected by applying vibratory energy to at least said symbols.

References Cited by the Examiner
UNITED STATES PATENTS

| | | | |
|---|---|---|---|
| 2,688,065 | 8/1954 | Clark | 219—86 |
| 2,727,122 | 12/1955 | Gartner | 219—86 |
| 2,846,563 | 8/1958 | Cronin | 219—86 |
| 3,067,319 | 12/1962 | Zamboldi et al. | 219—117 |
| 3,132,238 | 5/1964 | Wiley et al. | 219—117 |

JOSEPH V. TRUHE, *Primary Examiner.*

ANTHONY BARTIS, *Examiner.*